United States Patent
Hu et al.

(10) Patent No.: US 10,856,392 B2
(45) Date of Patent: Dec. 1, 2020

(54) LIGHT SOURCE DRIVING DEVICE

(71) Applicant: Guangzhou Guangju Intelligent Technology Co., Ltd., Guangzhou (CN)

(72) Inventors: Jun Hu, Guangzhou (CN); Yongming Deng, Guangzhou (CN); Ping Liu, Guangzhou (CN)

(73) Assignee: GUANGZHOU GUANGJU INTELLIGENT TECHNOLOGY CO., LTD., Guangdong (CN)

( * ) Notice: Subject to any disclaimer, the term of this patent is extended or adjusted under 35 U.S.C. 154(b) by 200 days.

(21) Appl. No.: 16/076,016

(22) PCT Filed: Mar. 29, 2015

(86) PCT No.: PCT/CN2015/075342
§ 371 (c)(1),
(2) Date: Aug. 7, 2018

(87) PCT Pub. No.: WO2016/119295
PCT Pub. Date: Aug. 4, 2016

(65) Prior Publication Data
US 2020/0128651 A1    Apr. 23, 2020

(30) Foreign Application Priority Data
Jan. 28, 2015 (CN) .................. 2015 1 00453580

(51) Int. Cl.
*H05B 47/13* (2020.01)
*H05B 45/10* (2020.01)
(Continued)

(52) U.S. Cl.
CPC ............. *H05B 47/13* (2020.01); *G01N 22/00* (2013.01); *H05B 45/10* (2020.01); *H05B 47/11* (2020.01)

(58) Field of Classification Search
CPC ........ H05B 47/10; H05B 47/11; H05B 45/10; H05B 45/14; G01N 22/00
See application file for complete search history.

(56) References Cited

U.S. PATENT DOCUMENTS 5,490,069 A * 2/1996 Gioutsos ............... B60R 21/013
701/45
2004/0189722 A1 * 9/2004 Acres ..................... G01C 23/00
715/866

(Continued)

FOREIGN PATENT DOCUMENTS

| CN | 101738641 | 6/2010 |
|---|---|---|
| CN | 201582689 | 9/2010 |

(Continued)

OTHER PUBLICATIONS

International Written Opinion dated Oct. 22, 2015 from corresponding PCT/CN2015/075342.

(Continued)

*Primary Examiner* — Amy Cohen Johnson
*Assistant Examiner* — Syed M Kaiser
(74) *Attorney, Agent, or Firm* — Dragon Sun Law Firm, PC; Jinggao Li, Esq.

(57) ABSTRACT

The present disclosure discloses a light source driving device, and the light source driving device comprises a sensing unit and a processing unit, wherein the sensing unit at least comprises a microwave sensing module; the sensing unit is at least used for sensing whether any human activity exists within the action range based on microwave sensing according to a certain microwave sensing cycle, and periodically outputting a sensing signal to the processing unit; and the processing unit is used for processing the sensing signal, so that the driving device can adaptively control the turn-on and turn-off of the light source and the brightness change of the light source. Based on this, a dynamic intel- (Continued)

ligent light source driving device without a user's turn-on and turn-off action and based on environmental state sensing is realized.

10 Claims, 7 Drawing Sheets

(51) Int. Cl.
*G01N 22/00* (2006.01)
*H05B 47/11* (2020.01)

(56) References Cited

U.S. PATENT DOCUMENTS

| | | | |
|---|---|---|---|
| 2004/0212321 A1* | 10/2004 | Lys | H05B 45/3725 |
| | | | 315/291 |
| 2005/0046584 A1* | 3/2005 | Breed | E05F 15/43 |
| | | | 340/13.31 |
| 2005/0128751 A1* | 6/2005 | Roberge | F21K 9/00 |
| | | | 362/276 |
| 2006/0022214 A1* | 2/2006 | Morgan | H05B 45/50 |
| | | | 257/99 |
| 2007/0119263 A1* | 5/2007 | Henry | G01F 1/8436 |
| | | | 73/861.356 |
| 2009/0015172 A1 | 1/2009 | Huang et al. | |
| 2012/0026726 A1* | 2/2012 | Recker | H01Q 1/44 |
| | | | 362/157 |
| 2013/0024029 A1* | 1/2013 | Tran | A61B 5/1113 |
| | | | 700/278 |
| 2013/0201316 A1* | 8/2013 | Binder | H04L 67/12 |
| | | | 348/77 |
| 2015/0102995 A1* | 4/2015 | Shen | G06F 3/013 |
| | | | 345/156 |
| 2015/0334336 A1* | 11/2015 | Chiu | H04N 5/4403 |
| | | | 348/383 |

FOREIGN PATENT DOCUMENTS

| | | | |
|---|---|---|---|
| CN | 102014560 | | 4/2011 |
| CN | 102196641 | | 9/2011 |
| CN | 202634846 | | 12/2012 |
| CN | 202634846 U | * | 12/2012 |
| CN | 103281842 | | 9/2013 |
| CN | 103375700 | | 10/2013 |
| CN | 103533713 | | 1/2014 |
| EP | 1585077 | | 10/2005 |

OTHER PUBLICATIONS

1st office action for Chinese patent application 2015100453580.
2nd office action for Chinese patent application 2015100453580.
3rd office action for Chinese patent application 2015100453580.
Priminilary report from corresponding PCT/CN2015/075342.
Search report for Chinese patent application 2015100453580.

* cited by examiner

LIGHT SOURCE DRIVING DEVICE

CROSS-REFERENCE TO RELATED APPLICATIONS

This application is a national phase application of PCT Application No. PCT/CN2015/075342. This application claims priority from PCT Application No. PCT/CN2015/075342, filed Mar. 29, 2015 and CN Application No. 2015100453580, filed Jan. 28, 2015, the contents of which are incorporated herein in the entirety by reference.

TECHNICAL FIELD

The present disclosure relates to the field of illumination, and in particular to a light source driving device.

BACKGROUND

On one hand, in the prior art, controlled turn-on and turn-off and brightness regulation of a light source can be realized in the manner that an intelligent control system is additionally arranged based on conventional switches and circuits. Besides, fluorescent lamps and LED lamps, simple filament lamps also need additionally-arranged triac dimmers, controlled turn-on and turn-off and brightness regulation of a light source can be realized, and the intelligence degree is limited.

On the other hand, when an LED light source module is driven, for an LED drive power supply of digital control or analogue control, and different mounting occasions of the LED light source module, the corresponding environment needs always change. Even a control system is mounted, someone is also needed for monitoring and management in a monitoring center, each specific illumination light source cannot automatically sense dynamic changes in the environment according to the people flow of the environment so as to enable the light source to operate at different power levels through regulation. In other words, the purposes that in the prior art, the light source is automatically turned on and turned off due to people flow to save energy and prolong the service life, cannot be realized.

At current, microwave and infrared sensing lamps exist in the market, but in the prior art, the lamps are triggered to be turned on by simply judging whether human activity is present in environment, but the brightness cannot be regulated according to the state; and in the prior art, a timing circuit is used for turning off the lamps at set time, so that all these years, such light sources can only be used in environment of passageways, stairwells and the like without being used for environment where people stay for a long term, such as rooms. The requirements for automatic and switch-free intelligent control on the functional illumination of people cannot be met fundamentally.

SUMMARY

For that reason, in order to solve one or more of the technical problems, the present disclosure provides a light source driving device which is characterized in that,
the driving device comprises a sensing unit and a processing unit, wherein the sensing unit at least comprises a microwave sensing module;
the sensing unit is at least used for sensing whether any human activity exists within the action range based on microwave sensing according to a certain microwave sensing cycle, and periodically outputting a sensing signal to the processing unit; and
the processing unit is used for processing the sensing signal, so that the driving device can adaptively control the turn-on and turn-off of the light source and the brightness change of the light source.

Through the technical scheme, a dynamic light source driving device without a user's manual turn-on and turn-off action and based on environmental state sensing, which not only is energy-saving but is also intelligent, can be realized.

DETAILED DESCRIPTION

Figure 1:
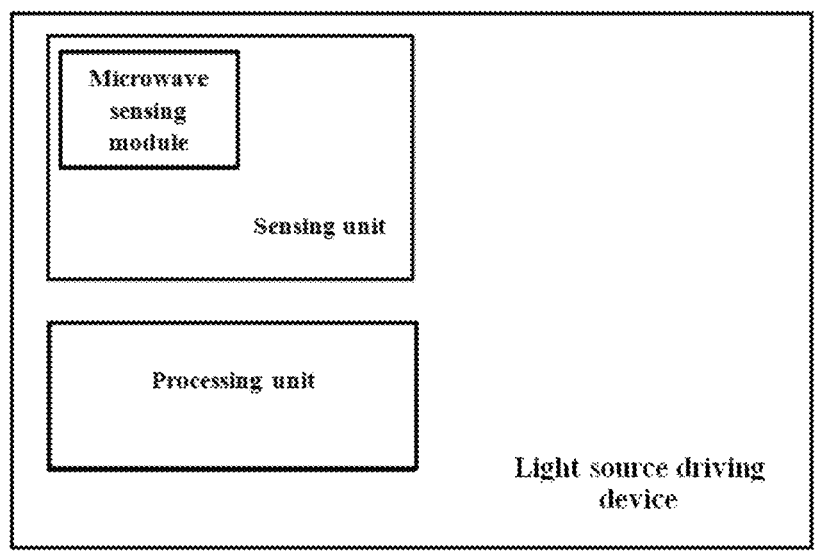
FIG. 1 is a structural diagram of a device in one embodiment of the present disclosure.

By reference to FIG. 1 to FIG. 11, one embodiment discloses a light source driving device, wherein
the driving device comprises a sensing unit and a processing unit, wherein the sensing unit at least comprises a microwave sensing module;
the sensing unit is at least used for sensing whether any human activity exists within the action range based on microwave sensing according to a certain microwave sensing cycle, and periodically outputting a sensing signal to the processing unit; and
the processing unit is used for processing the sensing signal, so that the driving device can adaptively control the turn-on and turn-off of the light source and the brightness change of the light source.

Through the technical scheme, a dynamic light source driving device without a user's turn-on and turn-off action and based on human or object activities can be realized through the microwave sensing module, so that an intelligent light source driving device based on environmental state sensing is realized. The light source driving device neither needs the user's turn-on and turn-off action, nor needs user's regulation on the light source.

Obviously, the embodiment does not need any original switch for a user to turn on and turn off the light source or regulate the brightness of the light source. The obvious difference from control of a light source through intelligent terminals such as intelligent phones and tablet PCs lies in that the embodiment does not need any user intervention. The light source driving device can autonomously manage the light source.

The technical scheme of the embodiment can obviously meet the following demands that: when an air conditioner is used in a long-term dark-light environment, if a user wants the light source to be automatically turned on when someone is present and to be automatically turned off when no person is present and also wants the brightness of the light source to be further regulated according to sensed human activities, for example, more specifically, the brightness is increased when someone is close to the microwave sensing module and reduced when someone is far away from the microwave sensing module; generally, the brightness is increased when signals reflected by human activities sensed by microwaves are stronger and reduced when the signals are weaker. Microwave signals corresponding to different movement frequency features, different people flows, and the like can be selectively recognized so as to be used for the technical scheme of the disclosure.

Preferably, in another embodiment, the change amplitude of the brightness level can be customized. For example, the change amplitude of the brightness level can specifically be different differences. If under the rated power, the brightness is defined as 100%, then the change amplitude can include but is not limited to the following examples: 70%, 50%, 30% and 5%.

Preferably, in another embodiment,
the processing unit comprises a signal processing module, a control module and a power supply driving module, wherein
the signal processing module can be used for processing a signal output by the sensing unit into a digital signal required by the control module and outputting the digital signal to the control module;
the control module is used for outputting a control signal to the power supply driving module after conducting fuzzy operation on the received digital signal and comparing the digital signal with control strategies in a database; and
the power supply driving module is used for controlling the turn-on and turn-off of the light source and controlling the brightness change of the light source according to the control signal.

The embodiment gives a realization way of the processing unit. Obviously, if the manufacturing technology permits, the signal processing module can also be highly integrated with the control module even the power supply driving module, provided the function of the signal processing module can be realized, wherein the control module can be realized through various suitable processors. Moreover, because sensing signals acquired by quite numerous sensors are analog signals and certain sensors can directly convert the sensing signals into digital signals, the signal processing module is not limited to various ADCs (analog-digital converters) suitable for the disclosure. Assuming that a certain sensing signal is processed by the sensor into a digital signal, then as described in the embodiment, the signal processing module processes the signal output by the sensing unit into a digital signal required by the control module and outputs the digital signal to the control module. The embodiment reflects the technical route of the present disclosure from one side, i.e. the turn-on and turn-off and the brightness regulation of the light source are controlled through specific module design of the processing unit by taking the control strategies in the database as a core. Under the premise of meeting basic performance requirements, how to conduct fuzzy operation on data is not important. The fuzzy operation or fuzzy computation method in mathematics can both be used.

Preferably, in another embodiment, the control strategies in the database comprise the following rules:
(1) when the light source is in the turn-off state, if the digital signal is judged to be unchanged by comparing the current sensing moment with the sensing moment in the last cycle, a control signal in the turn-off state is maintained continuously, and the light source maintains the turn-off state; or else, a control signal is outputted and maintained, so that the working state of the light source is regulated to the working state corresponding to the current environment illuminance; and
(2) when the light source is in the working state at a brightness level, if the digital signal is judged to be unchanged by comparing the current sensing moment with the sensing moment in the last cycle, a control signal in the current working state is maintained continuously, and the light source continues to maintain the working state at the current brightness level.

Furthermore, if at a certain interval sensing moment after a certain interval of the current sensing moment, the digital signal is still judged to be unchanged within the whole certain interval, then a control signal is outputted, so that the working state of the light source is regulated to the working state with one level below the current brightness level; or else, a control signal is outputted, so that the working state of the light source is regulated to the working state with one level above the current brightness level, wherein
the working state with one level below the current brightness level comprises the working state with the lowest brightness level being 0 and the light source being turned off; and
the working state with one level above the current brightness level comprises the working state with the maximum power level being 100% and of the rated power.

The embodiment realizes the control strategies in the database in a better way and gives specific program control rules which are characterized in that no matter the light source is in a turn-off or turn-on state, cyclic detection is conducted at a certain interval, and the brightness is reduced or increased step by step according to the actual brightness. The step-by-step regulation does not generate at any time, when a change is always not sensed within a certain time range, the brightness is changed until the light source is turned off; and when the light source is from the turn-off state to the turn-on state, is the user wants the light source to be turned on as soon as possible without a period of time. Surely, because not all control strategies can be listed one by one, the present disclosure does not exclude selection of other control strategies according to specific demands of light source usage occasions.

Preferably, in another embodiment,
the sensing unit also comprises an environment illuminance sensing module,
and the sensing unit is also used for periodically outputting a sensing signal to the processing unit based on environment illuminance sensing according to a certain illuminance sensing cycle, so that the processing unit uses the environment illuminance sensing signal to control the turn-on and the turn-off of the light source and regulate the brightness of the light source.

In the embodiment, the environment illuminance sensing module is additionally arranged, and assists in controlling the turn-on and turn-off and the brightness regulation of the light source by sensing environment illuminance. For example, when the current environment illuminance conditions are very good, it is indicated that there are other external light sources or sunshine, and it is not necessary to continue to increase the brightness according to microwave sensing results even not necessary to turn on the light source, and vice versa. That is to say, the embodiment can have adaptability based on environment illumination, provide more intelligent brightness regulation by sensing the illuminance of the current light source environment, and correct the problem of too low or too high brightness caused by simple microwave sensing.

Preferably, in another embodiment,
the sensing unit also comprises an infrared sensing module,
and the sensing unit is also used for periodically outputting a sensing signal to the processing unit based on infrared signal sensing according to a certain infrared sensing cycle, so that the processing unit uses the sensing signal to control the turn-on and turn-off and regulate the brightness of the light source.

In the embodiment, the infrared sensing module is additionally arranged, and assists in controlling the turn-on and turn-off and the brightness regulation of the light source by sensing infrared signals. For example, the present disclosure can only control the turn-on and turn-off and brightness regulation of light sources within a certain range of an infrared signal source, and other light sources far from the infrared signal sources maintain the normally-off state. Furthermore, infrared signals of human are different from those of other animals, and the movement frequencies are also different. The supplementary means can also be combined with microwave sensing to prevent light sources from being falsely triggered by movements of other animals or objects.

In addition, it should be noted drat the infrared sending module and the environment illuminance sensing module can well cooperate with the microwave sensing module. Not only can the turn-on and turn-off and brightness regulation of the light source be controlled through each sensing module independently as needed, but also the turn-on and turn-off and brightness regulation of the light source can be controlled in a linkage way through two or three sensing modules as needed. Specific control rules can be developed as appropriate: generally, in order to better save energy, it is recommended to determine whether the most basic condition for turning on the light source is met or not according to the measuring signals of the environment illuminance sensing module if yes, the light source is further turned on and off and the brightness is regulated according to other sensing modules such as the microwave sensing module and/or the infrared sensing module.

Preferably, in another embodiment,
according to different effects of the surface area features and the movement features of humans and other objects and distances to the microwave sensing module on microwave sensing signals as well as the temperature features of humans and other objects, the processing unit is used to prevent other objects from falsely triggering the turn-on and turn-off of the light source and falsely triggering the brightness regulation of the light source.

For the embodiment, such false triggering action possibly caused by other objects includes but is not limited to the movement of a small animal and the sudden fall of an object. Because such objects have different surface areas and particularly different microwave-receiving surface areas from humans, such surface area features have an effect on the microwave sensing signal. In addition, the distance to the microwave sensing module has an effect on the microwave sensing signal, and the movement features also have an effect on the microwave sensing signal. The present disclosure can formulate control strategies based on the three effects to prevent falsely triggering the turn-on/turn-off and brightness regulation of the light source. Moreover, as humans have different temperature features from other objects, the present disclosure can also introduce the temperature features into other embodiments to prevent falsely triggering the turn-on/turn-off and brightness regulation of the light source by means of a joint action between an infrared sensing module or temperature sensing module of other type and the microwave sensing module. More specifically, it is assumed that a microwave oscillator with an operating frequency of 5.4 GHz and consisting of a loop antenna and a microwave transistor is arranged in the microwave sensing module. After the PN junctions of the internal microwave transistor are subjected to frequency mixing, weak frequency-shift signals (such as detected human movement signals) are detected by a beat method. The processing unit can remove interfering signals with too small amplitude firstly, and then only convert the detected frequency-shift signals with certain strength into constant-amplitude pulses with different widths. The circuit only identifies a single signal with an enough pulse width. Therefore, the movement change of a human body triggers a meaningful signal; correspondingly, weaker interfering signals generated from small animals, remote-range tree swinging, high-frequency communication signals, distant lightning and the turn-on and turn-off of household appliances can be eliminated. In other words, the processing unit can identify the signals which are really big enough and conform to a meaningful principle, such as human movement signals. Only by successfully identifying such signals, the processing unit can output corresponding control signals to control the power supply driving module to operate, so as to prevent a false triggering action.

Preferably, in another embodiment,
the certain microwave sensing cycle, the certain illuminance sensing cycle, and the certain infrared sensing cycle are different. In such case, the corresponding operating cycles of three sensing modules are somewhat different. However, the light source control function is not affected. The embodiment defines a specific method for realizing sensing cycles. Similarly, in another embodiment, the certain microwave sensing cycle, the certain illuminance sensing cycle and the certain infrared sensing cycle can also be the same cycle T. More preferably, the same cycle T is 1 s.

For the embodiments relevant to cycles, the cycles can be changed and reset at any time. Either sensing by cycle can be set in the sensing unit or processing by cycle can be set in the processing unit, and both sensing by cycle and processing by cycle can also be set. Regardless of which setting method is adopted, the adaptive on-off control and brightness regulation of the light source without requiring a switch in the present disclosure shall be available.

Preferably, in another embodiment,
when the light source is a fluorescent lamp, the driving device also comprises an electronic ballast,
wherein the electronic ballast comprises a voltage preheating circuit. When the fluorescent lamp is turned on, the voltage preheating circuit is used to apply a preheating voltage to electrodes at two ends of the fluorescent lamp for about is so as to preheat the electrodes at two ends, and the fluorescent lamp can be normally turned on.

The embodiment is different from the prior art that microwave sensing is only used for filament lamps or LED lamps but cannot be used for fluorescent lamps. The embodiment can be used for the fluorescent lamps. Because the fluorescent lamps cannot be turned on frequently, the embodiment discloses a novel electronic ballast with voltage preheating as stated, which not only guarantees the life of the fluorescent lamps but also realizes intelligent control at least based on microwave sensing.

Preferably, in another embodiment,
when the user waves one hand, the microwave sensing module can sense the hand-waving movement without help of any additional dimming modules. The processing unit is also used for increasing or reducing brightness based on the current brightness level or regulating brightness to certain brightness.

No matter what a light source or way is adopted by a dimming technology in the prior art, a dimming device or circuit needs to be additionally arranged in a loop, and dimming can be realized by adding a manual regulation manner. The extremely-inconvenient way restricts the use of the dimming technology in occasions of families, schools and malls. The way is not intelligent enough, and artificially adds energy consumption, which goes against energy saving and environmental protection.

For the embodiment, the hand-waving dimming defined in the present disclosure can achieve the intelligent hand-waving dimming function without additional dimming devices. Various dimming control strategies corresponding to hand-waving movements are added in the database, so that the hand-waving dimming can be realized. After waveform information obtained after information expressed by a hand-waving movement sensed by the sensor for microwave sensing is processed by the signal processing module is compared with the database, a dimming command is generated and transmitted to the power supply driving module for execution. As a movement with a frequency of 5 Hz or above is difficult to achieve through a lot of acquisition and simulations for various human body movements in real life, the disclosure can judge whether a human body makes a low-frequency movement of not higher than 5 Hz in the range of activities in the environment. Generally speaking, if there is a requirement for the brightness of the lamps, the frequency generated by a person's conscious hand-waving movement required for dimming is greater than 5 Hz, which is exactly a starting point for the disclosure to fulfil the hand-waving dimming. On specific occasions, the threshold herein may be a threshold being lower or higher than 5 Hz, which will not hamper the implementation of the technical scheme in the disclosure. A 5 Hz threshold is taken for instance: after the sensor for microwave sensing senses a movement frequency greater than 5 Hz, the waveform outputted to the signal processing module has greater difference from that of other movements. The waveform corresponding to such hand-waving movement is processed by the signal processing module and then transmitted to the processing unit for fuzzy processing. Then the brightness is controlled according to a preset dimming strategy, such as 80% or 50%; of course, the brightness regulation strategy can also be one for increasing or reducing brightness at the current brightness level. The brightness is increased or reduced again during another hand-waving movement after a certain time interval.

Figure 2:
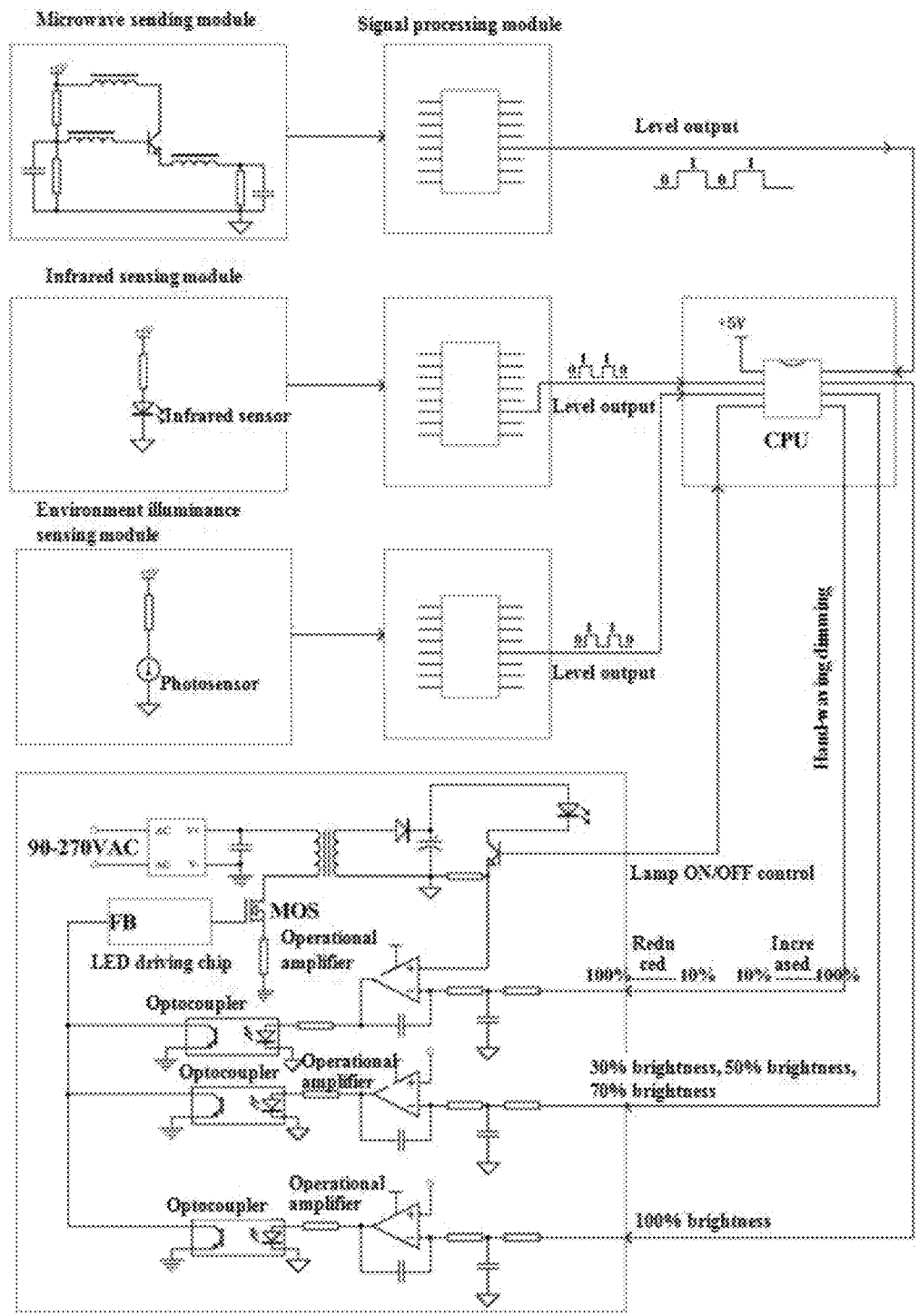
FIG. 2 is a circuit diagram of a light source driving device in one embodiment of the present disclosure.

By reference to FIG. 2, as for the LED light source, the following embodiment gives a more specific realization way of the light source driving device. The circuit of the driving device comprises
an electromagnetic compatibility EMI filter, a full-bridge rectifier, a power factor corrector APFC, a control module, an LLC resonant half-bridge driver, a microwave sensing module, an environment illuminance sensing module, an infrared sensing module, signal processing modules for all sensing modules, an LED light source power supply driving module and an LED light source module, wherein
the EMI filter is used for preventing high-frequency interference produced by the driver from being sent back to a power grid;
the full-bridge rectifier is used for converting an AC power supply into a DC power supply;
the power factor corrector APFC circuit is used for controlling the waveform of an AC power input current to follow the waveform of the voltage well, increasing the power factor to be greater than 0.99, adjusting different pulse widths according to different output voltages, reducing power grid harmonics and producing an adjustable DC bus voltage;
the control module realizes the turn-on, hand-waving dimming, turn-off, 100% brightness and 30%, 50% and 70% brightness regulation of the LED light source module via control signals; and
the LLC resonant half-bridge driver outputs a voltage required for the working of the LED module.

After being processed by the signal processing module, microwave signals reflected by the distance between a human body and the lamp and the movement speed, different environment light intensity signals and human body temperature signals sensed by the microwave sensing module, the environment illuminance sensing module and the infrared sensing module are output to the control module, wherein the signal processing module comprises an ADC module.

The control module carries out fuzzy operation on the processed signals received and then carries out operation with control strategies preset in a database, wherein the preset control strategies cover the data about running time and level intensity of various working states including turn-on, hand-waving dimming, turn-off, 100% brightness, 30%, 50% and 70% brightness, and the like. Finally, the control module outputs PWM control signals to an operational amplifier for amplification. After optical coupler isolation, the control signals are transmitted to the LLC resonant half-bridge driver. In other words, the present disclosure can intelligently control the output pulse width of the LLC resonant half-bridge driver and can well control different working states of the LED light source module by accurately controlling various sensing signals with the control strategies preset in the database.

Therefore, based on the signal intensity of various sensors, the present disclosure can realize the technical effect of dynamically managing the operating state of the LED light source module through better dynamic operation and database type control strategies. The ADC module can easily provide higher, quicker and more accurate resolution and also has better linear frequency control. Especially in different human body distance and movement amplitude high-precision dynamic environments, human body distance, movement and temperature recognition signal processing modules can sense the environmental conditions around the lamp in a real time manner, which not only can guarantee that the lamp can be normally turned on according to the brightness preset in the preset strategies when someone is present, but also can guarantee that the lamp can maintain low brightness or can be turned off when no one is present, and the function of hand-waving dimming can also be realized. In fact, hand-waving dimming is also a function caused by microwave sensing. When the lamp is turned on, the control module quickly senses the surrounding environment of the LED light source module through various sensing modules, and can also read the result obtained by comparing the environment states of the LED light source module with the database according to the ADC module when the LED light source module operates. For example, when human activities or object movements are present within 8 m from the LED light source module and the intensity of a certain signal is greater than or smaller than a certain set value, by comparing with the database, if the compared signal intensity meets the need of a certain working state, a CPU starts to output a control command and provides a stable PWM pulse signal to the LED light source power supply driving module so as to control various working states of the LED light source module without a switch. Therefore, the working states of the LED light source module can be controlled very precisely, intelligently and dynamically.

Furthermore, another embodiment is shown as below. The following hexadecimal data is the real-time. AD sampled values measured by the microwave sensing module within a certain time period when a human body is in a static state basically with no obvious movements, as shown in FIG. 3 which reflects microwave sensing data in the human body in the static state.

8A 8A 8B 8A 8A 8A 8A 8A 8A 8B 8A 8A 8A 8A 89 8A
89 8A 8A 8A 8A 8A 8B 8A 8B 8A 8B 8B 8B 8C 8C 8C 8C
8B 8C 8C 8C 8D 8D 8D 8D 8D 8E 8E 8D 8E 8D 8E 8D 8D
8D 8D 8C 8C 8C 8C 8C 8C 8D 8C 8C 8C 8C 8D 8C 8D 8D
8D 8D 8D 8D 8D 8D 8D 8E 8D 8E 8E 8E 8E 8E 8E 8F 8E
8F 8F 8F 8F 8F 8F 8E 8E 8E 8E 8D 8D 8D 8C 8D 8D 8D
8D 8D 8D 8C 8D 8C 8D 8C 8C 8B 8C 8C 8C 8C 8B 8B 8B
8B 8B 8C 8C 8C 8C 8C 8C 8B 8B 8B 8C 8B 8B 8B 8B 8A
8B 8B 8A 8B 8B 8B 8B 8B 8C 8C 8B 8B 8B 8B 8C 8B 8B
8A 8A 8A 8A 8A 8A 8A 8A 8A 89 8A 89 8A 89 89 89
89 89 89 89 89 88 88 88 87 88 88 88 88 88 88 87 88
87 87 87 87 87 87 87 87 87 87 86 87 87 88 88 87 88
88 87 87 87 87 87 87 87 87 87 88 87 87 87 88 87 88 87
88 87 88 87 88 87 87 87 87 88 88 89 88 89 89 89 8A 89
89 89 8A 89 8A 8A 8A 89 8A 89 89 8A 8A 89 89 89 8A 8A
8A 8A 8A 8A 89 8A 89 89 89 89 88 89 88 88 88 88 88
88 88 89 89 88 88 88 88 88 88 88 88 88 87 88 87 88 87
88 87 88 88 88 88 88 88 88 88 88 88 88 88 88 88 88 87
87 87 87 88 89 88 88 88 88 89 88 89 88 88 89 88 88 89 89
89 89 89 89 8A 8A 8A 8A 8A 8B 8A 8B 8A 8B 8A 8B 8A
8A 8A 8A 8A 8A 8A 8A 8A 8B 8A 8A 8A 8A 8B 8A 8A
8B 8A 8B 8B 8B 8A 8B 8B 8B 8C 8C 8C 8C 8C 8C 8C
8C 8C 8C 8B 8B 8B 8B 8B 8B 8B 8A 8B 8B 8B 8B 8B 8B
8B 8A 8A 89 8A 89 8A 89 89 89 8A 8A 8A 8A 8A 8A 8B
8B 8A 8B 8B 8B 8B 8A 8A 8A 8A 8A 89 8A 8A 8A 8A 89
8A 8A 8A 8A 8B 89 8A 8A 8A 8B 8B 8A 8A 8A 8B 8B 8B
8B 8B 8B 8B 8C 8C 8C 8C 8D 8C 8D 8D 8D 8D 8D
8D 8E 8D 8D 8D 8E 8D 8E 8D 8E 8E 8E 8E 8F 8F 90 8F
8F 8F 8F 8F 8F 8F 8F 8F 8F 8F 90 90 90 90 8F 90
90 90 8F 8F 90 8F 90 90 8F 91 90 90 90 91 91 91 91 91
91 90 91 91 8F 90 90 90 90 90 90 8F 90 8F 90 8F 90
90 91 90 91 91 91 91 91 91 92 92 91 91 91 91 92
91 91 91 91 92 91 91 91 90 90 90 90 91 90 8F 90 8F 90 90
90 8F 8F 8F 8E 8F 8F 8E 8E 8E 8E 8E 8D 8E 8D 8E
8E 8E 8F 8E 8E 8E 8E 8E 8D 8D 8D 8D 8D 8C 8C 8D 8C 8C 8C 8C 8C 8C 8B 8C 8B 8B 8C 8B 8B 8B 8B 8B
8B 8C 8C 8B 8C 8C 8C 8C 8D 8D 8D 8C 8C 8C 8C 8C
8B 8A 8A 8A 8A 8B 8A 8A 8A 8A 8B 8A 8B 8A 8B 8A
8B 8B 8A 8A 8B 8B 8A 8A 8B 8B 8B 8B 8A 8B 8B 8A
8C 8B 8B 8B 8B 8B 8B 8B 8B 8B 8C 8B 8C 8C 8C 8D 8D
8E 8E 8E 8E 8E 8E 8F 8F 8F 8F 8E 8E 8E 8E 8E 8E 8E
8E 8E 8E 8E 8D 8E 8E 8E 8E 8E 8E 8E 8E 8E 8E
8E 8E 8E 8E 8F 8F 8F 8E 8F 8E 8F 8E 8E 8E 8D 8D 8D
8D 8D 8C 8C 8C 8C 8C 8D 8D 8D 8D 8D 8C 8C 8C 8C
8B 8B 8B 8B 8B 8A 8B 8B 8B 8B 8B 8C 8C 8B 8C 8B 8B
8B 8B 8B 8B 8A 8A 8A 8A 8A 89 8A 89 89 8A 89 89 89
89 89 88 89 89 88 89 88 88 88 88 88 88 88 88 88 88 88
89 89 89 89 89 89 89 88 88 88 88 87 87 87 88 88 87 88 88
88 88 87 87 87 87 87 86 87 86 86 86 87 86 86 87 87 87
88 88 88 88 88 88 88 87 88 87 88 87 87 87 87 87 88 88 88
88 88 88 89 88 88 89 88 88 88 88 87 87 88 87 88 86 87 87
87 87 87 89 88 88 87 88 88 88 88 88 88 88 88 88 88 88
89 88 89 88 89 89 89 89 89 88 88 88 88 88 87 87 88 88
88 88 88 89 89 89 8A 89 8A 89 8A 8A 89 8A 89 8A 8A 8A
8A 8A 8A 8A 8A 89 8A 8B 8A 8A 8A 8A 8A 8A 89 8A 89
8A 89 89 88 89 89 89 89 8A 8A 8A 8B 8B 8A 8A 8B 8A
8A 8B 8A 8B 8A 8B 8A 8B 8B 8B 8B 8B 8C 8C 8C 8C 8C
8C 8D 8B 8C 8C 8C 8D 8C 8C 8C 8C 8B 8C 8B 8C 8C 84
84 84 83 85 84 84 83 83 83 83 83 83 83 83 83 83 83
84 83 83 84 83 83 84 84 83 84 84 84 84 84 83 83 83 84
83 84 83 84 83 84 83 84 84 83 83 84 83 84 83 84 83 84
83 84 84 84 84 84 84 84 84 85 84 85 85 85 84 84 84 84
84 84 84 84 84 84 85 84 85 85 85 85 85 85 84 84 84 85
84 84 84 85 84 85 85 85 85 85 85 84 84 84 84 84
84 85 84 84 85 84 85 84 85 85 85 85 85 85 84 85 85 84
84 85 84 84 84 84 84 84 84 85 85 85 85 86 85 86 86 85
86 85 86 85 85 86 86 86 85 86 86 86 86 87 86 86 87 87 87
87 87 87 87 87 87 87 87 87 87 88 88 88 88 88 88 87 88
87 87 87 87 86 86 87 87 87 87 87 87 87 87 87 87 86 86
87 86 86 86 85 87 86 85 86 86 86 86 86 86 86 87 86 86
86 86 86 86 86 86 86 87 86 86 86 86 87 87 88 87 88 88
88 88 87 88 88 87 88 87 87 87 88 87 87 87 87 87 88 88 88
88 88 88 88 88 88 88 88 87 88 88 88 88 88 88 88 87 88
88 88 87 87 87 87 87 86 87 87 87 86 87 87 87 87 87 88
87 87 87 87 88 87 88 88 87 87 87 87 87 87 87 87 88 88 88
88 88 89 88 89 89 89 89 88 89 89 89 8A 89 89 89 8A
89 8A 89 89 8A 8A 8A 8A 8A 8A 8A 8A 8A 8A 8A 89
8A 8A 8A 8A 8A 8A 8A 8B 8A 8A 8B 8B 8A 8B 8B 8B
83 8B 8C 8C 8C 8C 8C 8D 8D 8D 8D 8D 8D 8D 8D 8D
8D 8E 8D 8D 8D 8E 8E 8E 8E 8E 8F 8F 8E 8F 8F 8F 8F
8F 8F 90 90 90 8F 90 8F 90 8F 90 8F 90 90 8F 91 90 90
90 90 90 90 90 90 90 90 8F 90 90 90 90 8F 8F 8F 90 90 90
8F 8F 8F 8E 8E 8F 8F 8F 8F 8F 8E 8F 8F 8E 8F 8F 8F 8E
8F 8F 8E 8E 8E 8E 8E 8E 8E 8D 8E 8E 8D 8E 8E 8D
8E 8D 8E 8E 8E 8D 8D 8D 8D 8D 8C 8D 8C 8D 8C 8C 8C
8C 8C 8C 8C 8D 8D 8C 8E 8D 8D 8D 8D 8D 8D 8D
8D 8D 8D 8D 8D 8E 8E 8E 8E 8E 8E 8E 8E 8E 8E
8E 8E 8E 8E 8E 8E 8E 8E 8E 8E 8E 8E 8E 8E 8F
8E 8F 8E 8E 8F 8F 8E 8F 8E 8E 8F 8E 8F 8F 90 90 91 90
91 91 90 90 91 90 91 91 90 91 91 91 91 91 91 91 91 91
91 91 91 91 91 91 91 91 91 91 90 90 91 90 90 90 90 90
90 90 8F 90 90 90 8F 90 90 8F 90 8F 8F 8F 8F 8F 8E 90
8F 90 90 90 90 90 8F 90 90 91 90 90 90 90 90 90 90 90
90 90 90 90 90 8F 90 8F 90 8F 8F 8F 8F 8F 8F 8E 8F 8F
8F 8F 8F 8F 8F 8F 8F 8E 8E 8F 8F 8F 8F 8F 8F 8F 90
8F 90 8F 90 90 90 91 91 91 91 91 91 91 91 91 91 90 91
91 90 91 91 91 91 91 91 91 90 90 90 90 90 90 90 90 90
90 90 90 90 90 90 90 90 90 8F 91 8F 90 90 90 8F 8F 90
8F 90 8F 90 8F 8F 8F 8F 8F 8F 8F 8F 8F 8F 8F 8F 8F 8F
8F 8F 8E 8E 8E 8E 8E 8E 8E 8F 8E 8E 8E 8E 8F 8E 8E
8F 8E 8E 8E 8E 8E 8E 8E 8E 8E 8E 8E 8E 8E 8E
8E 8D 8D 8E 8D 8C 8F 8C 8E 8E 8D 8E 8D 8E 8E 8E 8E 8E 8E 8E 8E 8D 8E 8C 8D 8E 8D 8D 8D 8D 8D 8D 8D
8E 8E 8D 8E 8E 8D 8E 8D 8E 8D 8E 8E 8D 8F 8D 8F
8D 8E 8F 8E 8F 8F 8F 8F 8E 8E 8F 8E 8E 90 8E 8E 8F
8F 8E 8F 8F 8E 8F 8E 90 90 8F 90 90 8F 91 8F 90 91 8F
90 8F 90 8F 8E 90 8F 8F 91 8F 90 90 90 8F 8F 8F 8F 8F
8E 8F 8E 90 8E 8F 8F 8E 90 8F 8E 8F 90 8F 8E 8F
8E 8F 8F 8E 8E 8F 8F 8F 8F 8E 8F 8F 8F 8F 8E 90 90 90
8F 90 8F 90 90 8F 90 90 8F 90 90 8F 90 91 91 91 91 91
91 91 91 91 91 91 91 91 91 91 91 90 91 92 91 91 92 91 92
90 92 91 91 92 92 92 92 91 91 92 90 91 90 91 90 91 90 92
90 91 91 90 90 91 91 90 90 90 90 90 90 90 90 90 90 90
92 91 90 90 90 90 90 91 91 90 90 8F 91 8F 90 91

Figure 3:
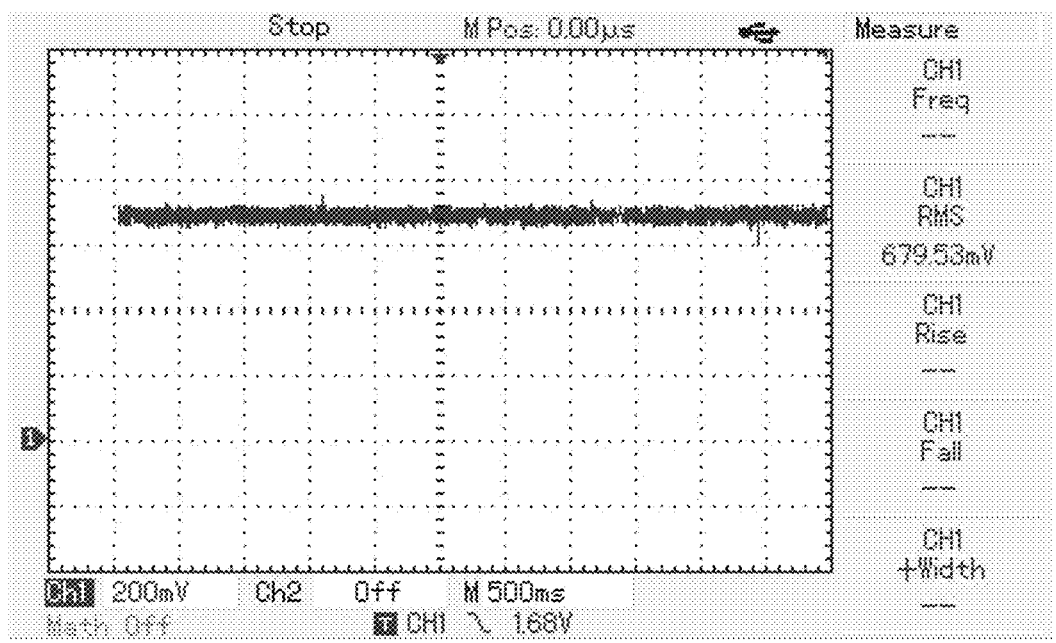
FIG. 3 is a waveform diagram of a signal sensed when a human body is in a static state in one embodiment of the present disclosure.

As seen from the sampled data for the human body in the static state and as seen in FIG. 3, the waveform change amplitude is mainly within the range of 80-9F, with the waveform vibration amplitude range basically unchanged. By assuming that all the other sampled data conforming to the data change law correspond to the human body in the static state, then the processing unit can determine that the human body is in the static state through fuzzy operations. Of course, the static state in theory is not limited to human bodies.

Figure 4:
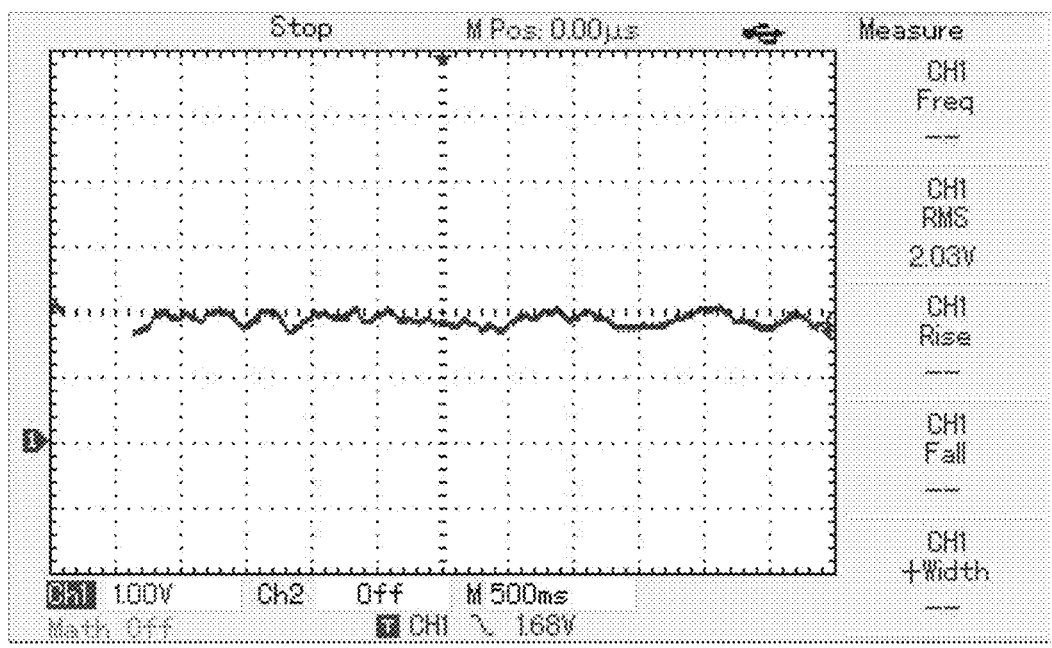
FIG. 4 is a waveform diagram of a signal sensed when a human body is in a static state after fuzzy operation processing in one embodiment of the present disclosure.

FIG. 4 shows a waveform obtained by processing the sensing data for human bodies in a static state through fuzzy operations. The processing unit sends out control signals after comparing data represented by such waveforms with the database exactly.

Figure 5:
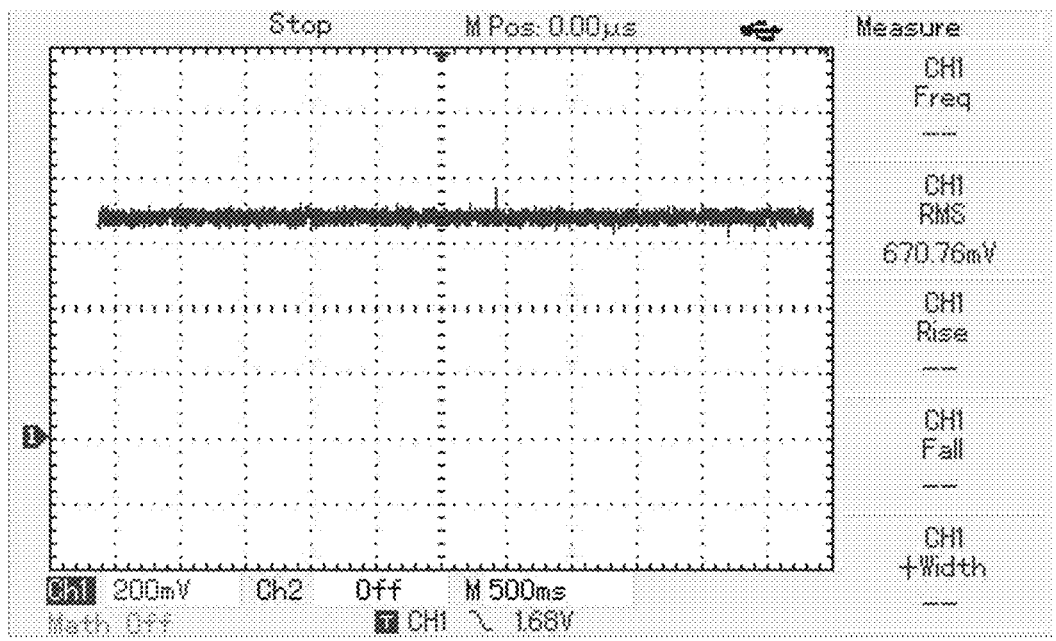
FIG. 5 is a waveform diagram of a signal sensed when a human body continuously moves in one embodiment of the present disclosure.

Furthermore, another embodiment is shown as below. The following hexadecimal data is the real-time AD sampled values within a certain time period when a human body is in a continuous movement state, as shown in FIG. 5 which reflects microwave sensing data of the human body in the continuous movement state.

A0 9D 9A 97 94 90 8E 8B 88 85 83 80 7E 7C 79 77 75
72 70 6E 6C 69 67 65 63 61 5F 5D 5B 59 57 55 53 52 4F
4E 4D 4B 49 47 46 44 43 40 3F 3E 3C 3A 39 38 36 35 32
32 30 2F 2E 2C 2B 2A 29 27 26 25 24 23 21 20 1F 1F 1C
1C 1B 19 18 17 16 15 15 13 12 11 10 0F 0E 0D 0C 0C 0B
0A 09 08 08 07 06 06 05 05 04 04 03 03 02 02 01 02 02 02
02 02 02 02 02 02 02 02 02 03 03 03 03 03 03 03 04 03 03
04 04 05 05 05 06 06 07 07 07 07 08 08 09 0A 0A 0B 0C
0C 0D 0E 0F 10 11 12 13 14 15 16 18 19 1A 1B 1C 1E 1F
20 22 23 25 26 28 29 2B 2C 2E 30 31 33 34 36 38 39 3C
3D 3F 40 42 44 46 48 4A 4C 4E 50 52 54 56 58 59 5C 5D
5F 61 64 65 66 68 6A 6C 6D 6F 72 72 74 76 78 7A 7C 7D
7F 80 82 84 84 86 87 89 8A 8B 8D 8E 90 90 92 93 94 95
97 98 99 9A 9C 9C 9D 9E A0 A1 A2 A3 A4 A5 A7 A8 A8
AA AA AC AE AE AF B1 B1 B2 B3 B4 B5 B7 B7 B9 B9
BA BB BD BC BE BE C0 C1 C2 C4 C4 C7 C6 C8 C9 CA
CA CC CD CE CF D0 D1 D2 D3 D5 D6 D7 D9 DA DB DC
DD DF E0 E2 E3 E4 E6 E8 E9 EC ED EF F1 F3 F6 F8 FB
FC FD FD FD FE FE FE FE FE FE FE FE FE FE FE
FE FE FE FE FE FE FE FE FE FE FE FE FE FD FE FE
FE FE FE FE FE FD FD FE FE FE FE FE FE FF FE FE
FE FE FE FE FE FE FE FE FE FE FE FE FE FE FE FE
FD FE FE FE FE FE FE FE FE FE FE FE FE FE FE FD
FE FE FE FE FE FE FE FE FE FE FD FE FE FE FE FE
FE FE FE FD FE FE FE FE FE FE FE FE FE FE FE FE
FE FE FE FE FE FE FE FE FE FD FE FE FE FE FE FE
FE FE FE FE FE FE FE FE FE FE FE FE FE FE FE FE
FE FE FE FE FE FE FID FE FE FE FE FE FE FE FE
FE FE FE FE FE FE FE FD FC FA F9 F7 F4 F2 EF EC
ER E5 E2 DE DA D6 D2 CD C9 C5 C0 BC B7 B3 AE AA
A6 A1 9D 99 95 91 8D 89 85 81 7D 7A 76 72 6E 6B 67 64
61 5D 5A 56 53 50 4C 49 46 43 40 3D 3A 37 34 31 2E 2B
28 24 22 1F 1B 19 15 13 10 0D 0A 07 04 02 01 00 00 00
00 00 00 00 00 00 00 00 00 00 00 00 00 00 00 00 00 00

00 00 00 00 00 00 00 00 00 00 00 00 00 00 00 00 00
00 00 00 00 00 00 00 00 01 01 01 01 01 01 01 01 01 01 01
01 01 02 01 02 02 02 02 02 02 02 02 02 02 02 02 02 02
02 02 02 02 01 02 01 02 01 02 02 02 01 01 01 01 01 01 01
01 01 01 01 01 01 01 01 02 01 01 02 01 01 01 01 01 01 01
01 01 01 01 01 01 01 01 01 01 02 01 02 01 01 02 02 02
02 02 02 02 02 02 02 02 02 02 03 03 03 03 03 03 04 04 04
04 05 05 05 06 06 07 07 07 09 0A 0A 0C 0D 0E 0F 10 12
13 14 16 18 1A 1C 1D 1F 20 23 25 26 28 213 2D 30 32 0C
0E 10 11 13 15 17 19 1B 1D 1F 22 25 27 2B 2D 31 33 36
3A 3D 41 44 47 4B 4E 51 55 58 5B 5F 62 65 68 6C 6F 72
76 79 7C 80 83 87 89 8C 8F 91 94 97 99 9B 9E A0 A2 A5
A7 AA AC AE B1 B3 B5 B7 B8 BB BC BE C0 C2 C5 C6
C8 CA CC CE CF D2 D4 D6 D9 DA DC DE E0 E2 E4 E6
E8 EA ED EE F0 F2 F5 F6 F9 FB FC FD FD FE FD FE FD
FE FE FE FE FE FE FE FE FE FE FE FE FE FE FE FE FE
FE FE FE FE FE FD FE FE FE FE FE FE FE FE FE FE
FE FE FE FE FE FE FE FE FE FE FE FE FE FE FE FE
FE FE FD FE FE FE FE FE FE FE FD FE FE FE FE FE FE
FE FE FE FE FE FE FE FE FE FE FE FE FE FE FE FE
FE FE FE FE FE FE FE FE FE FE FE FE FE FE FE FE
FE FE FE FE FE FE FD FE FE FE FE FE FE FE FE FE
FE FE FE FE FE FE FE FE FE FE FE FE FE FE FE FE
FE FE FE FE FE FE FE FE FE FE FE FE FE FE FE FE
FE FE FE FE FE FE FE FE FE FE FE FE FE FE FE FE
FE FE FE FE FE FE FE FE FE FE FE FE FE FE FE FE
FE FE FE FE FE FE FE FE FE FE FE FD FB F9 F7 F4
F1 EE EA E7 E3 DF DB D7 D4 CF CB C7 C3 BE BA B5
B2 AC A8 A4 9F 99 97 93 8F 8B 87 83 7F 7B 78 75 72 6E
6B 67 64 61 5D 5A 56 54 50 4D 4A 47 44 41 3E 3B 38 35
32 2F 2C 29 26 23 1F 1C 19 16 13 0F 0C 09 05 02 01 00
00 00 00 00 00 00 00 00 00 00 00 00 00 00 00 00 00 00
00 00 00 00 00 00 00 00 00 00 00 00 00 00 00 00 00 00
00 00 00 00 00 00 00 00 00 00 00 00 00 00 00 00 00 00
00 00 00 00 00 00 00 00 00 00 00 00 00 00 00 00 00 00
00 00 00 00 00 00 00 00 00 00 00 00 00 00 00 00 00 00
00 00 00 00 00 00 00 00 00 00 00 00 00 00 00 00 00 00
00 00 00 00 00 00 00 00 00 00 00 00 00 00 00 00 00 00
00 00 00 00 00 00 00 00 00 00 00 00 00 00 00 00 00 00
00 00 00 00 00 01 00 01 01 01 02 02 02 02 02 02 03 03
03 03 03 04 03 03 04 04 05 04 05 06 06 06 07 07 08 09 09
09 0A 0A 0B 0C 0C 0D 0D 0F 0F 10 11 12 13 13 14 15 16
17 17 18 18 19 1A 1A 1A 1B 1C 1C 1C 1E 1E 1F 1F 21 20
21 21 22 23 22 23 23 24 24 24 25 25 25 26 25 27 28 28 29
29 29 2B 2B 2B 2C 2D 2D 2E 2E 2F 2F 30 31 32 33 34 35
37 37 39 3A 3C 3D 3F 40 41 43 45 46 48 4A 4B 4E 4F 52
55 57 59 5B 5D 60 63 65 67 69 6C 6E 71 74 76 79 7C 7F
81 84 88 89 8D 90 94 96 99 9B 9E A1 A4 A7 A9 AC AE
91 B4 B6 BA BC BF C2 C4 C7 CA CD D0 D2 D5 D7 DB
DE E1 E4 E8 EB EE F2 F6 F9 FB FD FD FD FD FE FE FE
FE FD FE FE FE FE FE FE FE FE FE FE FE FE FE FE FE
FE FD FE FE FE FE FE FE FE FE FE FE FE FE FE FE
FE FE FE FE FD FE FE FE FE FE FE FE FE FE FE FE
FE FE FE FE FE FE FE FE FD FE FD FE FE FE FE FE
FE FE FE FE FE FE FE FE FE FE FE FE FE FE FE FE
FE FE FE FE FE FE FD FE FE FE FE FE FE FE FE FE
FE FE FE FE FE FE FE FD FE FE FE FE FE FE FE FE FD
FE FE FE FE FE FE FE FE FE FE FE FE FE FE FE FE
FE FE FE FE FE FE FE FE FE FE FE FE FE FE FE FE
FE FE FE FE FE FE FE FE FE FE FE FE FE FE FD FE
FE FE FD FE FD FD FD FE FE FE FE FE FE FE FE FE
FE FE FE FE FE FE FE FE FE FE FE FE FE FE FE FE
FE FE FE FE FE FE FE FE FE FE FE FD FE FE FC
F9 F7 F4 F1 EE EB E7 E3 DF DB D6 D2 CD C8 C4 BF BB
B6 B2 AC A8 A4 9F 9B 97 92 8E 8A 86 82 7E 7A 77 73

70 6D 6A 67 64 61 8E 47 49 4C 4E 4F 51 54 56 59 8A 5C
5F 63 65 68 6B 6E 71 74 76 79 7B 7E 80 83 86 88 8A 8D
8F 91 93 96 98 99 9C 9F A1 A3 A4 A6 A8 A9 AB AC AE
B0 B1 B2 B2 B4 B4 B5 B7 B7 B8 B8 B9 B9 B9 B9 BA B9
B9 B9 B9 B8 B7 B7 B5 B4 B4 B2 B1 B0 AF AE AC AB
AA A8 A7 A5 A4 A1 9F 9E 9C 9A 98 96 93 91 8F 8E 8B
8A 88 86 84 82 80 7E 7B 79 78 75 73 71 6F 6D 6B 69 67
65 64 62 61 8E 5D 5B 59 58 56 54 52 50 4F 4D 4B 49 48
46 45 44 43 41 40 3F 3E 3D 3C 3A 3A 39 38 37 35 34 33
32 31 31 30 2F 2F 2E 2F 2F 2E 2D 2D 2D 2C 2D 2C 2C
2C 2C 2C 2C 2C 2C 2C 2C 2C 2D 2D 2D 2E 2F 2F 2F 30
31 31 32 32 33 34 34 35 36 37 39 3A 3B 3D 3D 3E 40 41
42 44 46 47 48 4A 4B 4C 4E 4F 51 52 54 55 57 59 5B 5D
8E 60 62 63 64 66 67 69 6B 6D 6E 6F 71 72 74 76 78 79
7B 7C 7F 80 81 83 85 87 87 8A 8A 8C 8E 8E 90 91 92 94
96 97 98 9A 913 9C 9E 9F A1

As seen from the sampled data for the human body in a certain continuous movement state and as seen in FIG. 5, the waveform vibration amplitude has a relatively large range. By assuming that all the other sampled data conforming to the data change law correspond to the human body in the continuous movement state, then the processing unit can determine that the human body is in the continuous movement state through fuzzy operations.

Figure 6:
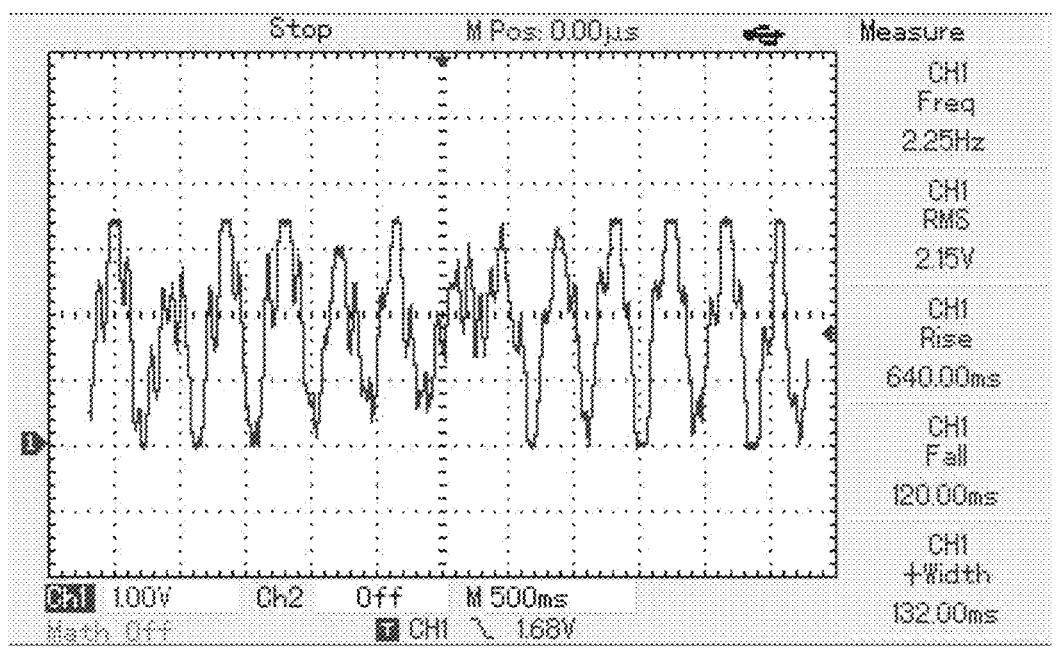
FIG. 6 is a waveform diagram of a signal sensed when a human body continuously moves after fuzzy operation processing in one embodiment of the present disclosure.

FIG. 6 shows a waveform obtained by processing the sensing data for human bodies in a continuous movement state through fuzzy operations. The processing unit sends out control signals after comparing data represented by such waveforms with the database exactly.

Furthermore, another embodiment is shown as below. The following hexadecimal data is the real-time AD sampled values within a certain time period when a human body is in a hand-waving dimming movement state, as shown in FIG. 7 which reflects microwave sensing data of the human body in the hand-waving movement state.

9C 9C 9C 9D 9D 9C 9D 9D 9E 9E 9E 9E 9D 9E 9E 9E
9E 9E 9F 9E 9E 9E 9E 9E 9E 9E 9E 9E 9E 9E 9E 9E
9E 9E 9E 9E 9E 9E 9E 9E 9E 9E 9E 9D 9D 9E 9D 9D
9C 9D 9D 9C 9D 9D 9C 9C 9D 9D 9D 9D 9D 9D 9D 9D
9D 9D 9D 9E 9D 9D 9D 9E 9D 9D 9D 9C 9D 9D 9D 9D
9D 9C 9C 9C 9C 9C 9C 9C 9C 9C 9B 9A 99 9A 9A 9A 9A
9A 9A 9A 9A 9A 9A 9A 9A 99 99 9A 99 99 98 99 99 98
98 98 99 99 9A 99 98 99 98 98 98 97 98 97 97 97 97
97 97 97 97 97 97 97 97 97 97 97 97 97 97 96 97 96 96
97 96 97 96 97 97 97 97 97 97 97 97 96 97 97 97 97 97
96 97 97 97 98 97 97 97 97 97 97 96 97 97 96 96 96 96
96 96 96 96 97 96 96 96 96 96 96 96 96 96 96 95 96 95 96
95 95 95 95 95 95 95 95 95 95 95 96 96 95 95 96 95 96 96
96 96 95 96 96 96 96 96 96 96 96 96 97 96 96 96 95 96 96
96 96 96 96 96 96 96 96 96 96 96 96 96 95 96 96 95 95
95 95 95 95 94 94 94 93 93 94 93 93 93 93 93 92 93 92 92
92 92 92 92 91 91 92 91 92 91 91 91 91 91 91 91 91 91
90 90 90 90 90 90 90 90 90 91 90 90 91 91 90 91 91 90 91
90 91 91 90 90 90 90 90 90 90 90 90 90 90 90 91 90 91
8F 90 90 90 90 90 8F 90 8F 8F 90 90 90 90 90 90 90 90
90 90 90 90 90 90 8F 90 90 90 90 90 90 8F 91 8F 91 90 90
91 91 90 90 90 90 90 90 90 90 90 90 90 90 90 90 90 90
90 8F 8F 8F 8F 8F 8F 8F 8F 8E 8F 8E 8E 8E 8E 8E 8E
8E 8E 8E 8D 8D 8D 8E 8D 8D 8D 8D 8D 8D 8D 8D 8D
8D 8E 8D 8D 8D 8D 8D 8C 8D 8C 8D 8C 8C 8C 8C
8C 8C 89 8C 8C 8B 8C 8B 8C 8C 8C 8C 8C 8C 8C 8B
89 8B 8B 8C 8C 8B 8B 8B 8C 8B 8C 8C 8C 8C 8C 8C
8C 8C 8C 8C 8C 8D 8D 8D 8C 8D 8D 8D 8D 8E 8D 8D
8D 8D RD 8D 8D RD 8D 8D 8D A6 A6 A6 A6 A6 A7 A6
A6 A7 A7 A7 A8 A8 A9 AA AA AC AB AC AE AE AF B0
B1 B1 B2 B3 B3 B3 B4 34 B4 B4 B5 B4 B5 BA BD BF C2
C5 C7 CB CD D0 D1 D3 D5 D7 D9 DB DE E1 E3 E6 E9
EC EF F2 F5 F7 F9 FB FC FD FD FD FE FE FE FD FE FE
FE FE FE FE FD FE FE FE ED FE FE FE FE FE FE FE FD
FE FE FE FE FE FE FE FE FE FE FE FE FE FE FE FE FD
FE FE FE FE FE FE FE FE FE FE FE FE FE FE FE FE FD
FE FE FE FE FE FE FE FE FE FE FE FE FE FE FE FE FE
FE FE FE FE FE FE FE FE FE FE FE FE FE FE FE FD FE
FE FE FE FE FE FE FE FE FE FE FE FE FE FE FE FE FE
FE FE FE FE FE FE FE FE FE FE FE FE FD FE FE FE FE
FE FE FE FE FE FE FE FE FE FE FE FE FE FE FE FE FE
FE FE FE FE FE FE FE FE FE FE FE FE FC FB F9 F7
F5 F3 F0 ED EA E8 E5 E2 DF DB D8 D5 D1 CE CA C6
C2 BE BA B6 B4 AF AB A7 A4 9F 9C 98 94 90 8D 89 85
82 7E 7A 76 73 6F 6C 68 65 62 8E 5B 58 55 51 4E 4B 47
44 41 3D 3A 37 33 30 2D 2A 27 23 21 1D 1A 17 14 11 0D
0B 07 04 01 00 00 00 00 00 00 00 00 00 00 00 00 00 00
00 00 00 00 00 00 00 00 00 00 00 00 00 00 00 00 00 00
00 00 00 00 00 00 00 00 00 00 00 00 00 00 00 00 00 00
00 00 00 00 00 00 00 00 00 00 01 01 02 03 04 05 06 06
07 08 08 0A 0A 0C 0C 0C 0C 0C 0C 0C 0B 0B 0A 0A 09
08 06 06 04 03 03 02 02 01 01 01 01 02 02 02 03 03 03 04
04 05 06 06 07 07 07 07 08 07 07 07 07 09 09 0A 0A 0B
0D 0E 10 13 14 17 18 1B 1C 1E 1F 20 22 23 25 25 26 27
27 27 28 29 29 2A 2A 2A 2A 2A 2A 29 29 28 27 26 24 22
21 1E 1D 1B 19 18 17 16 15 15 15 15 17 17 19 1A 1C 1D
1E 1F 20 21 21 22 21 21 20 1F 1E 1D 1C 1B 19 19 19 19
1A 1B 1C 1E 20 22 24 26 28 2B 2D 2F 31 32 33 34 35 36
37 38 39 3B 3C 3D 40 41 44 47 49 4B 4E 50 52 55 56 58
8A 8C 8E 60 62 64 67 69 6D 6F 72 74 77 79 7B 7D 7F 81
82 84 85 87 86 88 89 8A 8B 8B 8D 8D 8D 8F 8F 91 91 93
95 96 98 99 9A 9C 9D 9E A0 A0 A1 A3 A3 A5 A5 A7 A8
AA AC AE B0 B2 B3 B5 B8 B9 BA BC BD BF C1 C3 C6
C8 CB CE D2 D5 D9 DC E0 E3 E6 E8 EB EE F0 F2 F5 F8
FB FC FD FD FD FD FE FD FE FE FE FE FE FE FE FE
FE FD FE FE FE FE FE FE FE FE FE FE FE FE FE FE FE
FE FE FE FD FE FE FE FE FE FE FE FE FE FE FE FE FE
FE FE FE FE FE FE FE FE FE FE FE FE FE FE FE FE FE
FE FE FE FE FE FE FE FE FF FE FE FE FE FE FE FE FE
FE FE FE FE FE FE FE FE FE FE FE FE FE FE FE FE FE
FE FE FE FE FE FE FE FE FE FE FE FE FE FE FE FE FD
FE FE FE FE FD FE FE FE FE FE FE FE FE FE FE FE FE
FE FE FE FE FE FE FE FE FD FE FE FE FE FE FE FE FE
FE FE FE FE FE FE FE FE FE FD FE FE FE FE FE FE FE
FE FE FE FE FE FE FD FE FE FE FE FE FE FE FE FE FE
FE FE FE FE FE FE FE FE FE FE FE FE FE FE FE FE FE
FE FE FE FE FD FD FD FE FE FE FE FE FE FE FD FE
FE FE FE FE FE FD FE FD FC FC FB F8 F7 F5 F3 F0
EE EB E8 E5 E2 DE DB D7 D3 CF CB C7 C2 BE BB B7
B3 AE AB A6 A3 9F 9B 98 94 91 8D 8A 86 83 80 7D 7A
75 74 71 6E 6C 69 67 64 62 5F 5D 5A 57 55 53 50 4F 4D
4A 49 46 44 43 41 3F 3E 3C 3B 39 37 36 34 33 31 30 2E
2C 2A 29 28 26 25 23 22 21 1F 1E 1C 1B 19 18 16 14 13
11 10 0D 0C 0A 09 06 05 03 02 01 00 00 00 00 00 00 00
00 00 00 00 00 00 00 00 00 00 00 00 00 00 00 00 00 00
00 00 00 00 00 00 00 00 00 00 00 00 00 00 00 00 00 00
00 00 00 00 00 00 00 00 00 00 00 00 00 00 00 00 00 00
00 00 00 00 00 00 A5 A6 A6 A5 A5 A5 A5 A5 A6 A5 A5
A5 A6 A5 A5 A5 A5 A5 A5 A5 A5 A5 A5 A5 A5 A4 A6 A5
A5 A5 A6 A5 A6 A6 A6 A6 A6 A6 A6 A6 A7 A6 A7 A6 A6
A6 A7 A6 A6 A6 A6 A6 A6 A6 A6 A5 A5 A5 A5 A4 A5
A5 A5 A4 A4 A4 A4 A4 A5 A4 A5 A5 A4 A4 A4 A5 A4 A5
A4 A4 A4 A5 A4 A4 A4 A4 A4 A4 A4 A4 A4 A4 A4 A4
A4 A4 A4 A4 A4 A3 A3 A4 A3 A3 A3 A3 A3 A3 A3 A3
A4 A3 A3 A3 A3 A2 A2 A2 A2 A1 A1 A1 A0 A1 A0 A0 A1
A1 A0 A0 9F A0 A0 A0 A0 A0 A0 A0 A0 A0 A0 A0 A0
9F 9F A0 9F 9F 9F 9F 9F 9E 9E 9F 9E 9E 9E 9E 9D 9D
9D 9D 9D 9D 9D 9D 9D 9C 9C 9C 9C 9C 9C 9C 9C
9C 9C 9C 9D 9C 9D 9C 9D 9D 9C 9C 9C 9C 9C 9C 9D 9C 9D 9C 9C 9D 9C 9C 9D 9D 9C 9C 9D 9C 9D 9C 9C 9C 9D
9D 9C 9D 9D 9D 9D 9D 9D 9D 9D 9D 9D 9D 9D 9D
9D 9D 9D 9C 9C 9C 9C 9C 9D 9C 9D 9C 9C 9C 9C 9B 9C
9C 9B 9C 9B 9C 9B 9C 9C 9C 9C 9C 9B 9C 9B 9B 9C
9B 9B 9B 9B 9B 9B 9B 9B 9B 9B 9B 9B 9B 9A 9A 9A 9A 9A
9A 9A 9A 9A 9A 99 9A 9A 99 9A 9A 9A 9A 9A 9A 9A 9A 9A
9A 9A 9A 9A 9A 9A 9A 9A 9A 9A 9A 9A 9A 9B 9B 9A 9A
9A 9A 9A 9A 9A 9A 9A 9A 9A 9A 9A 9B 9B 9B 9B 9A
9B 9A 9A 9A 9A 9A 99 99 99 9A 98 99 99 99 99 99 99 99
99 99 99 99 99 99 99 99 99 99 99 99 99 9A 99 99 99 9A
9A 9A 9A 9A 9A 9A 9A 9A 9A 99 99 9A 99 9A 99 9A 9B
9A 9A 99 9A 9A 9A 99 99 99 99 99 99 99 99 99 99 99 99
99 99 98 99 99 99 99 99 99 99 99 99 99 98 99 98 98 99
98 97 98 98 97 97 97 97 97 97 97 97 97 97 97 97 97 97
97 96 96 97 96 96 96 97 97 96 96 96 96 96 96 96 96 96
96 96 96 95 95 95 96 96 96 95 96 96 96 96 96 95 96 95 95
95 95 94 95 94 95 94 94 95 95 95 94 94 94 95 94 94 94 95
94 94 94 94 94 94 93 93 94 93 93 93 93

Figure 7:
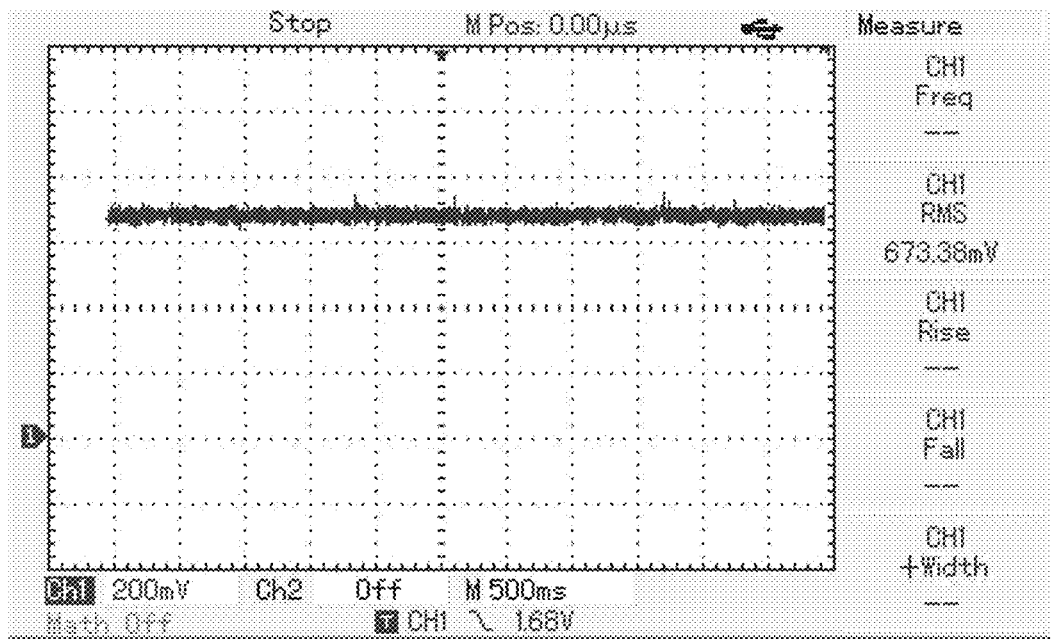
FIG. 7 is a waveform diagram of a signal sensed when a human body waves one hand to regulate light in one embodiment of the present disclosure.

As seen from the sampled data for the human body in the hand-waving movement state and as seen in FIG. 7, the hand waving is in an active change state. From beginning of hand waving to ending of hand waving, the data change law has the movement characteristics of being gentle firstly, then sharply fluctuating and afterwards being gentle again. By assuming that all the other sampled data conforming to the data change law correspond to hand-waving dinning movements of the human body, the processing unit can determine that the human body is in the hand-waving dimming state through fuzzy operations.

Figure 8:
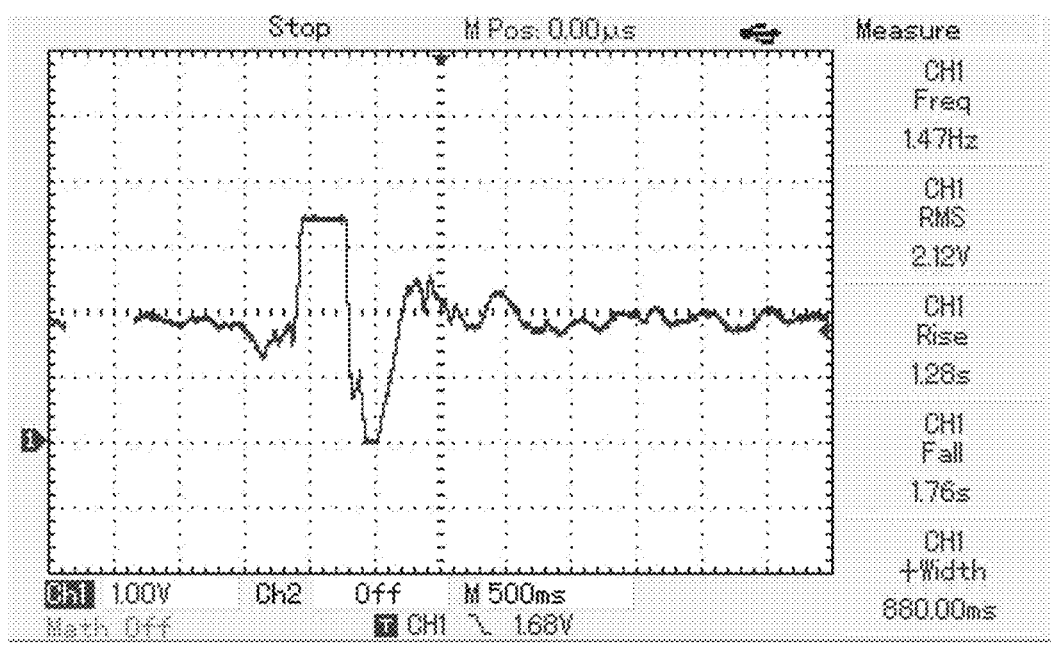
FIG. 8 is a waveform diagram of a signal sensed when a human body waves one hand to regulate light after fuzzy operation processing in one embodiment of the present disclosure.

FIG. 8 shows a waveform obtained by processing the sensing data for human bodies in a hand-waving dimming state through fuzzy operations. The processing unit sends out control signals after comparing data represented by such waveforms with the database exactly.

Refer to the embodiments and relevant FIGS. 3-8 for the sampling and fuzzy operations of the corresponding signals involved in the previous function against false triggering action disclosed by the disclosure.

Figure 9:
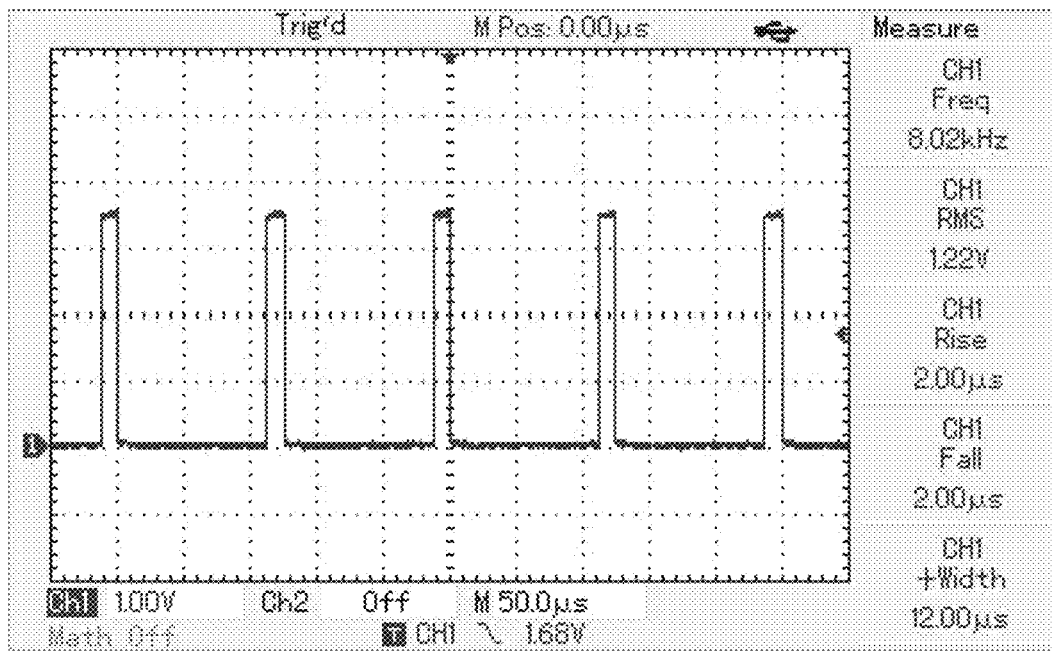
FIG. 9 to FIG. 11 are diagrams of control signals corresponding to PWM for regulating power to be 10%, 50% and 100% in one embodiment of the present disclosure.
Figure 10:
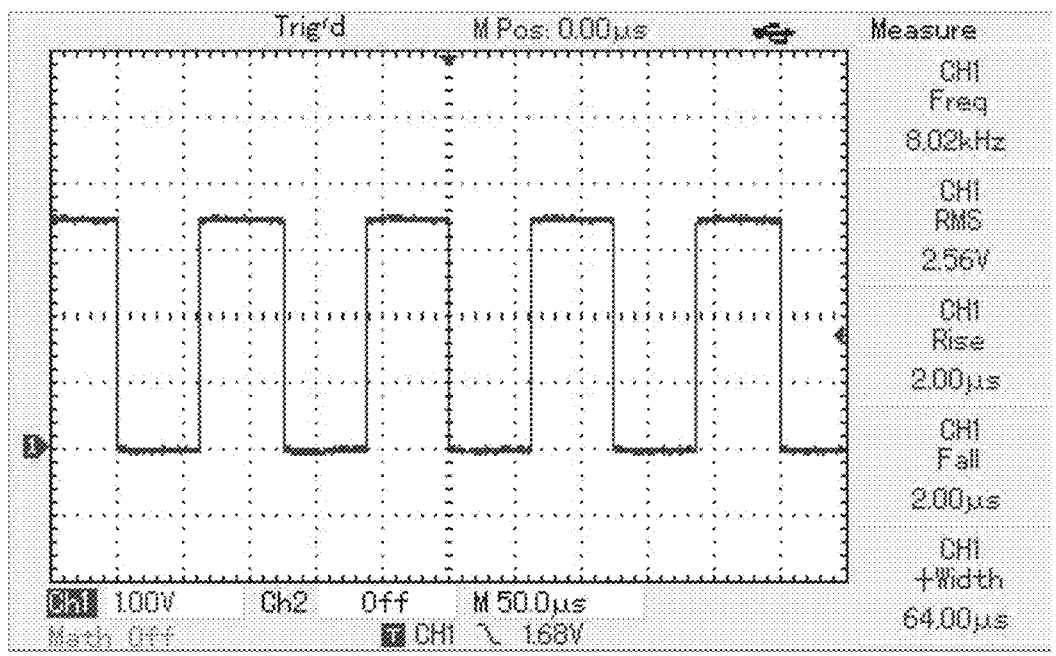
Figure 11:
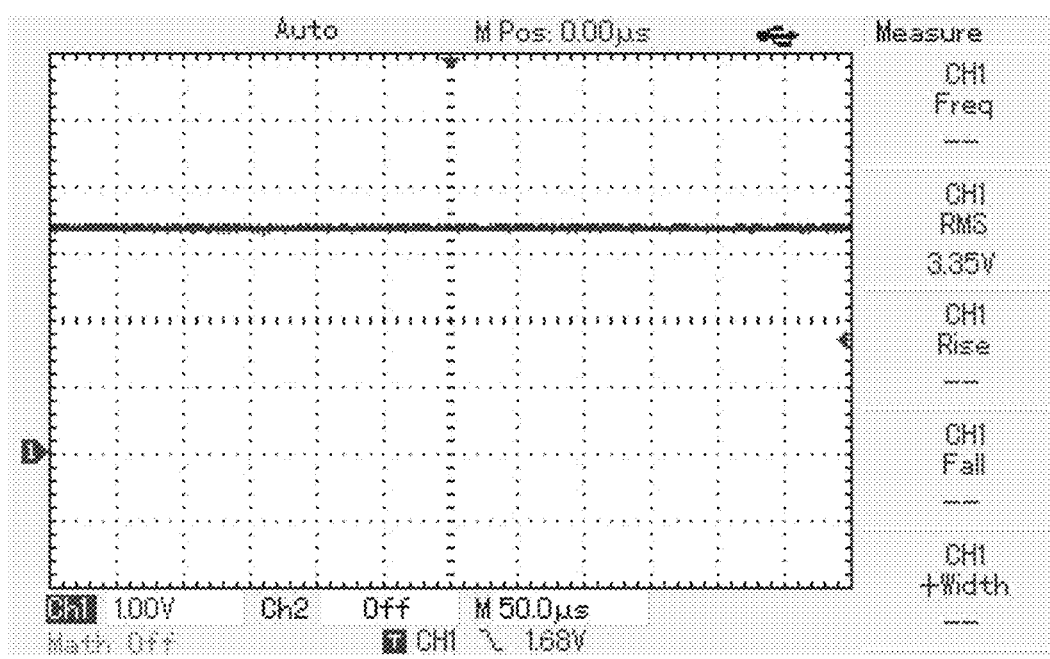

Furthermore, FIGS. 9 to 11 show diagrams of control signals corresponding to PWM for regulating the power of the light source to 10%, 50% and 100%.

The specific examples are used to state the principle and implementation of the present disclosure. The embodiments are used only to help understand the technical scheme and core ideas thereof of the present disclosure; those skilled in the art can make variations in the respects of the detailed description and the scope of application based on the ideas of the present disclosure. In conclusion, the specification shall not be understood as limitation to the present disclosure.

What is claimed is:

1. A light source driving device, comprising:
a sensing unit and a processing unit, wherein the sensing unit at least comprises a microwave sensing module;
the sensing unit is at least used for sensing whether any human activity exists within the action range based on microwave sensing according to a certain microwave sensing cycle, and periodically outputting a sensing signal to the processing unit;
the processing unit is used for processing the sensing signal, so that the driving device can adaptively control the turn-on and turn-off of the light source and the brightness change of the light source
the processing unit comprises a signal processing module, a control module and a power supply driving module;
the signal processing module is used for processing a signal output by the sensing unit into a digital signal required by the control module and outputting the digital signal to the control module;
the control module is used for outputting a control signal to the power supply driving module after conducting fuzzy operation on the received digital signal and comparing the digital signal with control strategies in a database;
the power supply driving module is used for controlling the turn-on and turn-off of the light source and controlling the brightness change of the light source according to the control signal; wherein control strategies in a database comprise the following rules:
(1) when the light source is in the turn-off state, if the digital signal is judged to be unchanged by comparing the current sensing moment with the sensing moment in the last cycle, a control signal in the turn-off state is maintained continuously, and the light source maintains the turn-off state; or else, a control signal is outputted and maintained, so that the working state of the light source is regulated to the working state corresponding to the current environment illuminance; and
(2) when the light source is currently in a working state at a certain brightness level, if the digital signal is judged to be unchanged by comparing the current sensing moment with the sensing moment in the last cycle, a control signal in the current working state is maintained continuously, and the light source continues to maintain the working state at the current brightness level;
if at a certain interval sensing moment after a certain interval of the current sensing moment, the digital signal is still judged to be unchanged within the whole certain interval, then a control signal is outputted, so that the working state of the light source is regulated to the working state with one level below the current brightness level; or else, a control signal is outputted, so that the working state of the light source is regulated to the working state with one level above the current brightness level, wherein
the working state with one level below the current brightness level comprises the working state with the lowest brightness level being 0 and the light source being turned off; and
the working state with one level above the current brightness level comprises the working state with the maximum brightness level being 100% and of the rated power.

2. The driving device according to claim 1, wherein the sensing unit further comprises an environment illuminance sensing module,
and the sensing unit is further used for periodically outputting an environment illuminance sensing signal to the processing unit based on environment illuminance sensing according to a certain environment illuminance sensing cycle, so that the processing unit uses the environment illuminance sensing signal to control the turn-on and turn-off of the light source and regulate the brightness of the light source.

3. A light source driving device, comprising:
a sensing unit and a processing unit, wherein the sensing unit at least comprises a microwave sensing module;
the sensing unit is at least used for sensing whether any human activity exists within the action range based on microwave sensing according to a certain microwave sensing cycle, and periodically outputting a sensing signal to the processing unit;
the processing unit is used for processing the sensing signal, so that the driving device can adaptively control the turn-on and turn-off of the light source and the brightness change of the light source the processing unit comprises a signal processing module, a control module and a power supply driving module;

the signal processing module is used for processing a signal output by the sensing unit into a digital signal required by the control module and outputting the digital signal to the control module;

the control module is used for outputting a control signal to the power supply driving module after conducting fuzzy operation on the received digital signal and comparing the digital signal with control strategies in a database;

the power supply driving module is used for controlling the turn-on and turn-off of the light source and controlling the brightness change of the light source according to the control signal, wherein the sensing unit further comprises an infrared sensing module, and the sensing unit is further used for periodically outputting an infrared sensing signal to the processing unit based on infrared signal sensing according to a certain infrared sensing cycle, so that the processing unit uses the infrared sensing signal to control the turn-on and turn-off of the light source and regulate the brightness of the light source.

4. The driving device according to claim 1, wherein when the user waves one hand, the microwave sensing module can sense the hand-waving movement without help of any additional dimming modules; and the processing unit is further used for increasing or reducing brightness based on the current brightness level or regulating brightness to certain brightness.

5. The driving device according to claim 3, wherein the certain microwave sensing cycle, the certain illuminance sensing cycle, and the certain infrared sensing cycle are different.

6. The driving device according to claim 3, wherein the certain microwave sensing cycle, the certain illuminance sensing cycle, and the certain infrared sensing cycle are the same cycle T.

7. The driving device according to claim 3, wherein according to different effects of the surface area features and the movement features of humans and other objects and distances to the microwave sensing module on microwave sensing signals as well as the temperature features of humans and other objects, the processing unit is used to prevent other objects from falsely triggering the turn-on and turn-off of the light source and falsely triggering the brightness regulation of the light source.

8. The driving device according to claim 6, wherein the same cycle T is 1s.

9. The driving device according to claim 3, wherein the sensing unit further comprises an environment illuminance sensing module, and the sensing unit is further used for periodically outputting an environment illuminance sensing signal to the processing unit based on environment illuminance sensing according to a certain environment illuminance sensing cycle, so that the processing unit uses the environment illuminance sensing signal to control the turn-on and turn-off of the light source and regulate the brightness of the light source.

10. The driving device according to claim 3, wherein when the user waves one hand, the microwave sensing module can sense the hand-waving movement without help of any additional dimming modules; and the processing unit is further used for increasing or reducing brightness based on the current brightness level or regulating brightness to certain brightness.

* * * * *